(12) United States Patent
Mehran et al.

(10) Patent No.: US 11,271,636 B2
(45) Date of Patent: Mar. 8, 2022

(54) CELLULAR TELECOMMUNICATIONS NETWORK

(71) Applicant: British Telecommunications Public Limited Company, London (GB)

(72) Inventors: Farhad Mehran, London (GB); Richard Mackenzie, London (GB); Anvar Tukmanov, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 16/484,659

(22) PCT Filed: Dec. 13, 2017

(86) PCT No.: PCT/EP2017/082585
§ 371 (c)(1),
(2) Date: Aug. 8, 2019

(87) PCT Pub. No.: WO2018/145796
PCT Pub. Date: Aug. 16, 2018

(65) Prior Publication Data
US 2020/0106516 A1    Apr. 2, 2020

(30) Foreign Application Priority Data

Feb. 8, 2017 (EP) ..................................... 17155116

(51) Int. Cl.
*H04B 7/155* (2006.01)
*H04W 84/04* (2009.01)

(52) U.S. Cl.
CPC ....... *H04B 7/15535* (2013.01); *H04W 84/047* (2013.01)

(58) Field of Classification Search
CPC . H04W 84/047; H04W 36/08; H04B 7/15535
(Continued)

(56) References Cited

U.S. PATENT DOCUMENTS 8,358,624 B1    1/2013   Ghaus et al.
8,792,364 B2    7/2014   Beck et al.
(Continued)

FOREIGN PATENT DOCUMENTS

CN    101909313 A    12/2010
CN    102202330 A    9/2011
(Continued)

OTHER PUBLICATIONS

Extended European Search Report for Application No. 17155116.1, dated Jul. 6, 2017 (8 pgs).
(Continued)

*Primary Examiner* — Gbemileke J Onamuti
(74) *Attorney, Agent, or Firm* — Patterson Thuente Pedersen, P.A.

(57) ABSTRACT

A method of operating a cellular telecommunications network, the cellular telecommunications network including a first base station, a User Equipment (UE) and a remote transceiver, wherein the first base station is adapted to send a signal to the UE, the method including receiving data from an external sensor indicating a first change in a propagation environment between the first base station and the UE; and, in response, the remote transceiver repeating a signal between the first base station and the UE.

6 Claims, 12 Drawing Sheets

(58) Field of Classification Search
USPC .......................................................... 370/315
See application file for complete search history.

(56) References Cited

U.S. PATENT DOCUMENTS

| | | | |
|---|---|---|---|
| 9,883,436 | B2 | 1/2018 | Brown |
| 10,123,241 | B2 | 11/2018 | Brown |
| 10,374,689 | B2 | 8/2019 | Breiling et al. |
| 2003/0048770 | A1 | 3/2003 | Proctor, Jr. |
| 2005/0048972 | A1 | 3/2005 | Dorenbosch et al. |
| 2007/0057843 | A1 | 3/2007 | Chang et al. |
| 2008/0112364 | A1 | 5/2008 | Kwon et al. |
| 2008/0144581 | A1 | 6/2008 | Ishizu et al. |
| 2008/0293394 | A1 | 11/2008 | Silver et al. |
| 2011/0143805 | A1* | 6/2011 | Ramasamy ......... H04W 52/325 455/522 |
| 2011/0217979 | A1 | 9/2011 | Nas |
| 2011/0281582 | A1 | 11/2011 | Jiang |
| 2012/0021744 | A1 | 1/2012 | Chin et al. |
| 2012/0122515 | A1 | 5/2012 | Han et al. |
| 2013/0201959 | A1 | 8/2013 | Guo et al. |
| 2013/0237245 | A1 | 9/2013 | Tinnakornsrisuphap et al. |
| 2014/0066069 | A1 | 3/2014 | Salami et al. |
| 2014/0114568 | A1 | 4/2014 | Park |
| 2014/0187243 | A1 | 7/2014 | Rune et al. |
| 2014/0341184 | A1 | 11/2014 | Dhanda et al. |
| 2014/0378129 | A1 | 12/2014 | Jiang et al. |
| 2015/0097731 | A1 | 4/2015 | Russell |
| 2015/0139015 | A1 | 5/2015 | Kadous et al. |
| 2015/0334604 | A1 | 11/2015 | Banks et al. |
| 2016/0029281 | A1 | 1/2016 | Zhou et al. |
| 2016/0183281 | A1 | 6/2016 | Yeh et al. |
| 2016/0249233 | A1* | 8/2016 | Murray ................. H04W 16/26 |
| 2017/0347298 | A1 | 11/2017 | Brown |
| 2018/0262922 | A1 | 9/2018 | Fitch |
| 2019/0028983 | A1 | 1/2019 | Mackenzie |
| 2019/0364480 | A1* | 11/2019 | Mehran ................. H04W 36/32 |

FOREIGN PATENT DOCUMENTS

| | | |
|---|---|---|
| CN | 102387590 A | 3/2012 |
| CN | 104160738 A | 11/2014 |
| EP | 2 857 798 A1 | 4/2015 |
| EP | 2750444 A4 | 5/2015 |
| EP | 2 991 242 A1 | 3/2016 |
| EP | 2991242 A1 | 3/2016 |
| GB | 2559556 A | 8/2018 |
| GB | 2559731 A | 8/2018 |
| JP | 2993087 B | 12/1999 |
| JP | 2001209891 A | 8/2001 |
| KR | 20100131025 A | 12/2010 |
| WO | WO-2009121833 A1 | 10/2009 |
| WO | WO-2010133256 A1 | 11/2010 |
| WO | WO-2011095687 A1 | 8/2011 |
| WO | WO-2014021761 A2 | 2/2014 |
| WO | WO-2015177601 A1 | 11/2015 |
| WO | WO-2015180126 A1 | 12/2015 |
| WO | WO-2018145796 A1 | 8/2018 |
| WO | WO-2018145797 A1 | 8/2018 |
| WO | WO-2018172002 | 9/2018 |
| WO | WO-2018172003 | 9/2018 |

OTHER PUBLICATIONS

Great Britain Combined Search and Examination Report under Sections 17 & 18(3), Application No. GB1702033.0, dated Nov. 29, 2017 (1 pg).
Great Britain Search Report under Section 17, Application No. GB1702033.0, dated Jun. 29, 2017 (1 pg).
Great Britain Corrected Search Report under Section 17, Application No. GB1702033.0, dated Jun. 29, 2017 (2 pgs).
International Search Report and Written Opinion for Application No. PCT/EP2017/082585, dated Apr. 9, 2018 (11 pgs).
Chandra K., et al., "CogCell: Cognitive Interplay between 60 GHz Picocells and 2.4/5 GHz Hotspots in the 5G Era," IEEE Communications Magazine, May 7, 2015, 14 pages.
Christodoulou C. G., et al., "Reconfigurable Antennas for Wireless and Space Applications," Proceedings of the IEEE, Jul. 2012, vol. 100, No. 7, pp. 2250-2261.
Combined Search and Examination Report under Section 17 and 18(3) for Application No. 1702030.6, dated on Jul. 7, 2017, 2 pages.
Corrected Search Report under Section 17 for Great Britain Application No. GB1702033.0, dated Jun. 29, 2017, 2 pages.
Examination Report under section 18(3) for Application No. 1702030.6, dated May 3, 2019, 2 pages.
Examination Report under Section 18(3) for Great Britain Application No. 1704702.8, dated Oct. 22, 2019, 4 pages.
Extended European Search Report for Application No. 17155118.7, dated Aug. 29, 2017, 7 pages.
Extended European Search Report for Application No. 17162851.4, dated Sep. 5, 2017, 13 pages.
Great Britain Combined Search and Examination Report Under Sections 17 & 18(3) for Application No. GB1704694.7, dated Aug. 14, 2017, 2 pages.
Great Britain Examination Report under Section 18(3) for Application No. GB1704694.7, dated Jun 5, 2019, 1 page.
Great Britain Search Report Under Section 17 for Application No. GB1704694.7, dated Aug. 11, 2017, 2 pages.
International Preliminary Report on Patentability for Application No. PCT/EP2017/082585, dated Aug. 22, 2019, 10 pages.
International Preliminary Report on Patentability for Application No. PCT/EP2017/082586, dated Aug. 22, 2019, 7 pages.
International Preliminary Report on Patentability for Application No. PCT/EP2018/054134, dated Oct. 3, 2019, 20 pages.
International Preliminary Report on Patentability for Application No. PCT/EP2018/054135, dated Oct. 3, 2019, 11 pages.
International Search Report and Written Opinion for Application No. PCT/EP2017/082586, dated Feb. 9, 2018, 9 pages.
International Search Report and Written Opinion for Application No. PCT/EP2018/054135, dated Apr. 29, 2018, 12 pages.
Legg, P., et al., "Load Balancing and Aggregation Algorithms for LTE Dual Connectivity," 2016 IEEE 83rd Vehicular Technology Conference (VTC Spring), May 15, 2016, 5 pages.
Search Report under Section 17 for Great Britain Application No. GB1702033.0, dated Jun. 29, 2017, 1 page.
Search Report under Section 17 for Great Britain Application No. 1702030.6, dated Jul. 6, 2017, 1 page.
Tunon D., et al., "Adding Dimensions to Wireless Systems with Orientation-Aware Devices and Reconfigurable Antennas," International Conference on Computing, Networking and Communications, Invited Position Papers, 2014, pp. 298-302.
Viprinet: Bonding LTE / 4G via LTE routers—better than Load Balancing I LTE /4G, "LTE—We Combine the Latest Mobile Phone Generation!," Jul. 1, 2019, retrieved from https://www.viprinet.com/en/technology/combinable-media/lte-4g, 4 pages.
Yang Z., et al., "Sensor-assisted Codebook-based Beamforming for Mobility Management in 60 GHz WLANs," IEEE 12th International Conference on Mobile Ad Hoc and Sensor Systems, 2015, pp. 333-341.
Application and File History for U.S. Appl. No. 16/487,740, filed Aug. 8, 2019, Inventor: Ramirez.
Application and Filing Receipt for U.S. Appl. No. 16/487,730, filed Aug. 8, 2019, Inventor: Mehran.
Application and Filing Receipt for U.S. Appl. No. 16/484,744, filed Aug. 21, 2019, Inventor: Mehran.
Great Britain Examination Report under Section 18(3) for Application No. GB1704702.8, dated Oct. 22, 2019, 4 pages.
Office Action for Chinese Application No. 201780085862.0, dated Dec. 3, 2020, 18 pages.

* cited by examiner

CELLULAR TELECOMMUNICATIONS NETWORK

CROSS-REFERENCE TO RELATED APPLICATION

The present application is a National Phase entry of PCT Application No. PCT/EP2017/082585, filed Dec. 13, 2017, which claims priority from European Patent Application No. 17155116.1 filed Feb. 8, 2017, each of which is fully incorporated herein by reference.

TECHNICAL FIELD

The present disclosure relates to a cellular telecommunications network.

BACKGROUND

A cellular telecommunications network includes a plurality of base stations which each transmit wireless signals about a coverage area (typically called a "cell") to one or more User Equipment (UE). The base stations are also connected to a core network to interconnect the UE with the Internet and core network nodes (such as the Operations Support System (OSS)). In conventional cellular networks, this "backhaul" connection between the base station and the core network is typically via an Ethernet or optical fiber link, but in modern cellular networks this may be in part via a Digital Subscriber Line (DSL) connection (for example, if the base station is a "Home evolved Node B" (HeNB), also known as a small cell).

As each base station has a limited coverage area and UEs are normally mobile, cellular networking protocols have a defined process for UEs to disconnect from one base station and connect to another base station with seamless connectivity. This process is known as a "handover". A general overview of the handover process will now be described, which is divided into three phases—preparation, execution and completion. The UE is connected to a first base station of a plurality of base stations. The first base station is therefore the UE's "serving" base station, and the UE is configured to perform measurements of various parameters of its serving base stations and of other base stations of the plurality of base stations. In the preparation phase, the serving base station provides one or more thresholds to the UE for the measurements. If the UE's measurements satisfy one or more of these thresholds, then a measurement report is sent from the UE to the serving base station, which triggers the handover of the UE to another base station. The serving base station determines which other base station should become the next serving base station for the UE based on the UE's measurement report. The serving base station and this target base station agree for the handover to take place. In the next phase, execution, the serving base station informs the UE that it should handover to the target base station. The UE will then connect to the target base station. In the completion phase, all routing of packets for the UE is changed to the target base station. The handover is then complete.

Conventional cellular networks have coverage areas which may span several squared kilometers. These are now often referred to as macrocells. In recent years, small cells (such as femtocells, metrocells, picocells and microcells) have also been deployed to increase capacity in the network. Most cellular networking protocols currently use frequency bands having a maximum frequency at or less than 3 GHz, which can offer large coverage areas but have limited capacity.

To increase capacity to accommodate growing demands for cellular data services, it is expected that future cellular networking protocols will additionally operate above 3 GHz (and often above 6 GHz). However, any cellular networking protocol using such relatively high-frequencies will be presented with technical problems. For example, the propagation distance of these relatively high-frequency transmissions will be relatively less than conventional cellular networks. In particular, the propagation distance will be very poor through solid materials, such that these relatively high-frequency transmissions are unlikely to penetrate through buildings. To address this problem, it is expected that network operators will deploy base stations using these relatively high-frequencies at a much higher density (per unit area) compared to base station deployment in conventional cellular networks.

Nonetheless, there is a further technical problem, which will now be described. As the coverage areas of these relatively high-frequency base stations have propagation distances which attenuate so rapidly (in air and especially through materials) compared to that of conventional base stations, the relatively high-frequency base stations have very little time to coordinate a handover. In current cellular networks, there is usually sufficient time for the UEs to complete the three phases of the handover before the UE moves out of the serving base station's coverage area. This is because the received signal power at the UE degrades at such a low rate that the handover may be triggered and complete before the UE moves to a position where there is no service from the serving base station at all. In relatively high-frequency base station coverage areas where the degradation of received signal power at the cell edge may be relatively high, it may not be possible for the UE, serving base station and target base station to coordinate such a handover before the UE moves out of range of the serving base station. In such a scenario, the Quality of Service (QoS) for the UE will drop significantly.

It is therefore desirable to alleviate some or all of the above problems.

SUMMARY

According to a first aspect of the disclosure, there is provided a method of operating a cellular telecommunications network, the cellular telecommunications network including a first base station, a User Equipment, UE, and a remote transceiver, wherein the first base station is adapted to send a signal to the UE, the method comprising receiving data from an external sensor indicating a first change in a propagation environment between the first base station and the UE; and, in response, the remote transceiver repeating a signal between the first base station and the UE.

Embodiments of the disclosure provide methods in which a cellular network may react to a changing propagation environment between a base station and a UE by activating a remote transceiver to repeat the signals between the base station and the UE. Accordingly, if the UE moves into a position in which it cannot receive signals from the base station, then this may trigger the remote transceiver to repeat those signals about a coverage area covering the UE's new position. The UE may therefore maintain connectivity despite a sudden change in coverage from its serving base station.

The remote transceiver may repeat the signal between the first base station and the UE at a first power level, and the method may further comprise the remote transceiver subsequently repeating the signal between the first base station and the UE at a second power level, the second power level being less than the first power level. In this manner, the UE may be take measurement report of its serving base station and of other base stations in the cellular network and, following a report indicating that a handover should take place, connect to one of the other base stations. Thus, by reducing the transmit power of the remote transceiver, the UE is encouraged to disconnect from its serving base station and connect to a more suitable base station for its new position. Furthermore, following the handover, the remote transceiver is no longer required and may enter an unpowered or low powered state, thus saving energy in the cellular network.

The remote transceiver may be a cellular repeater and may receive the data from the external sensor. Alternatively, the remote transceiver may have a wired connection to the first base station, the first base station may receive the data from the external sensor, and the method further comprises the first base station instructing the remote transceiver to repeat the signal between the first base station and the UE.

According to a second aspect of the disclosure, there is provided a computer program comprising instructions which, when the program is executed by a computer, cause the computer to carry out the method of the first aspect of the disclosure. The computer program may be stored on a computer-readable data carrier.

According to a third aspect of the disclosure, there is provided a node for a cellular telecommunications network, the cellular telecommunications network including a first base station and a User Equipment, UE, wherein the first base station is adapted to send a signal to the UE, the node comprising a transceiver adapted to receive data from an external sensor indicating a first change in a propagation environment between the first base station and the UE and, in response, repeat a signal between the first base station and the UE.

The transceiver may repeat the signal between the first base station and the UE at a first power level, and may be further adapted to subsequently repeat the signal between the first base station and the UE at a second power level, the second power level being less than the first power level.

The node may be a cellular repeater, wherein the transceiver may be adapted to receive the data from the external sensor.

According to a fourth aspect of the disclosure, there is provided a base station for a cellular telecommunications network, the cellular telecommunications network including a User Equipment, UE, and a remote transceiver, the base station comprising a transceiver adapted to send a signal to the UE and further adapted to receive data from an external sensor indicating a first change in a propagation environment between the base station and the UE; and in response, instruct the remote transceiver to repeat a signal between the base station and the UE.

BRIEF DESCRIPTION OF THE FIGURES

In order that the present disclosure may be better understood, embodiments thereof will now be described, by way of example only, with reference to the accompanying drawings in which:

FIG. 11 is a schematic diagram of a remote transceiver of the network of FIG. 10a.

DETAILED DESCRIPTION

Figure 1:
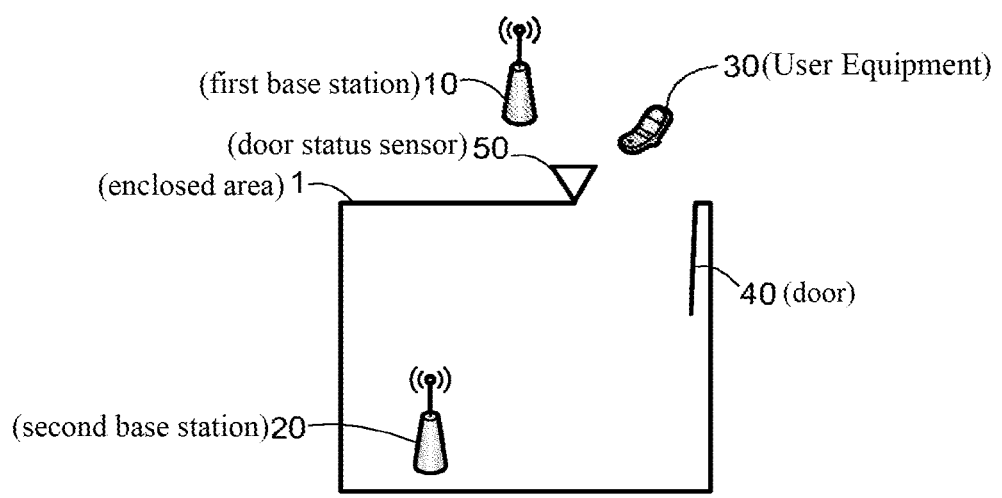
FIG. 1 is a schematic diagram illustrating a first embodiment of a cellular telecommunications network.

A first embodiment will now be described with reference to FIGS. 1 to 3. FIG. 1 illustrates an enclosed area 1 and a first and second base station 10, 20. The first base station 10 is outside the enclosed area and serves a User Equipment (UE) 30. The second base station 20 is inside the enclosed area. The enclosed area 1 includes a door 40, which is open in FIG. 1, and a door status sensor 50.

Figure 2:
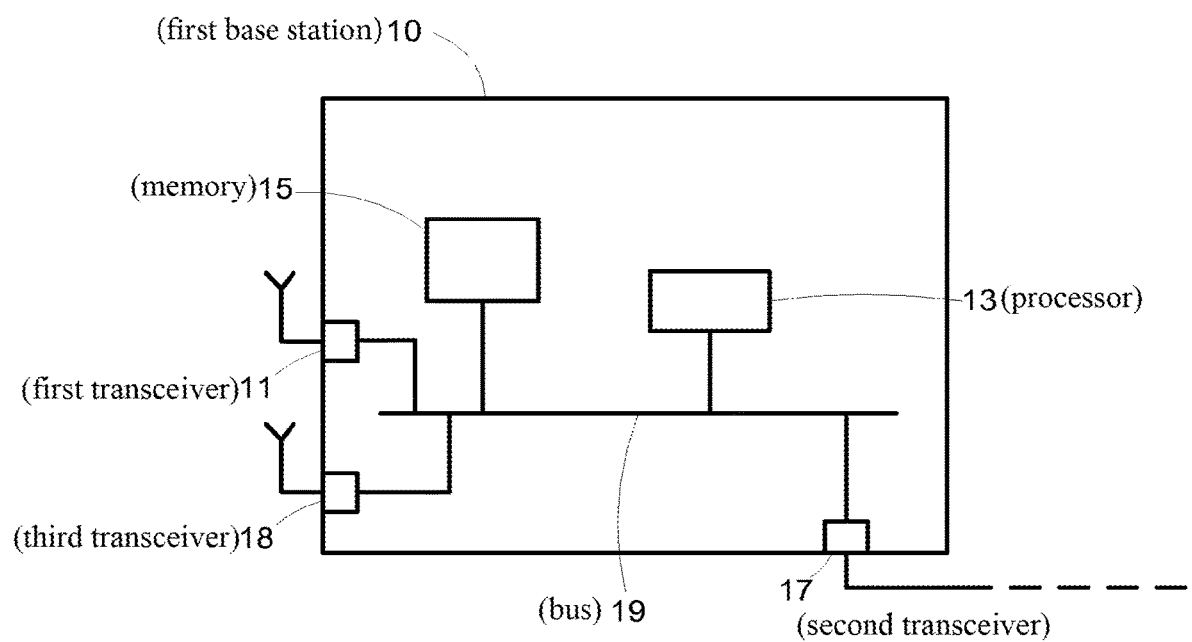
FIG. 2 is a schematic diagram of a base station of the network of FIG. 1.

The first base station 10 is shown in more detail in FIG. 2. The first base station 10 includes a first transceiver 11, a processor 13, memory 15, a second transceiver 17, and a third transceiver 18, all connected via bus 19. In this embodiment, the first transceiver 11 is an antenna configured for wireless communication via a cellular telecommunications protocol using a frequency band covering (at least in part) frequencies above 3 GHz. The second transceiver 17 is a backhaul interface (in this example, an optical fiber connection) for connecting the first base station 10 to the core network and the Internet. The third transceiver 18 is configured for wireless communication with the door status sensor 50.

In this embodiment, the first and second base stations 10, 20 are substantially the same and comprise the same components.

Figure 3:
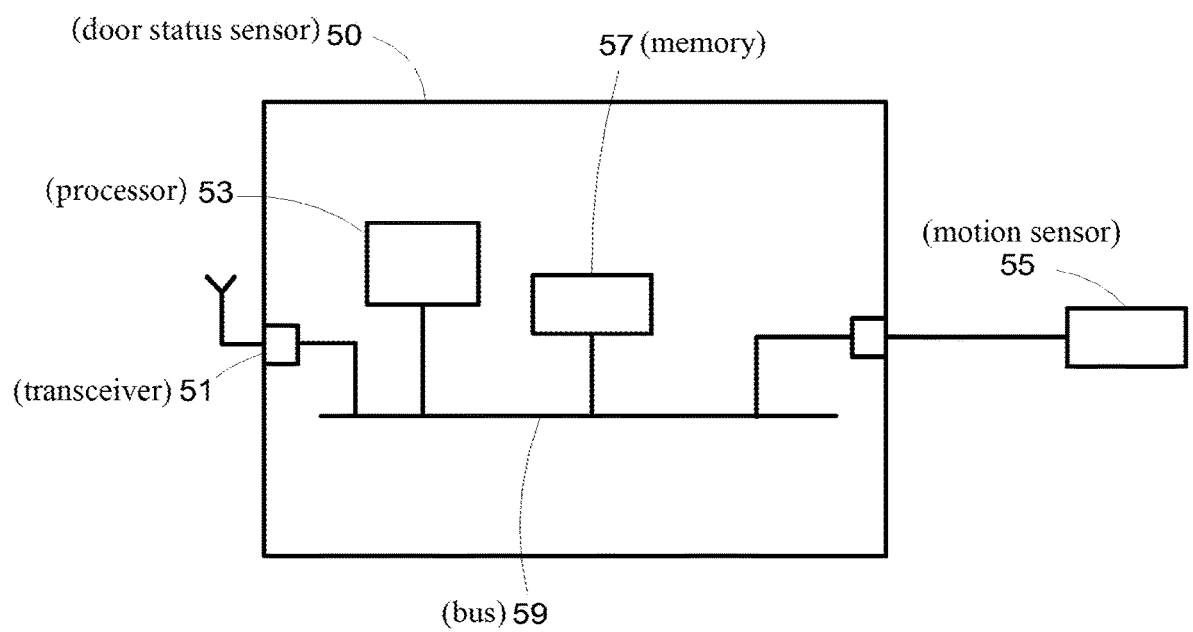
FIG. 3 is a schematic diagram of a sensor of the network of FIG. 1.

The door status sensor 50 is shown in more detail in FIG. 3. The sensor 50 includes a transceiver 51, a processor 53, a motion sensor 55, and memory 57, all connected via bus 59. The transceiver 51 is configured for wireless communications with the first and second base stations 10, 20. The motion sensor 55 is positioned on the door 40 and produces an electrical signal which is a function of the door opening angle, $\theta$. This signal is recorded in memory 57 together with a timestamp. It is therefore possible to determine if the door 40 is fully closed or fully open based on the maximum and minimum values of the door opening angle. Furthermore, it is also possible to determine whether the door is opening or closing based on whether the door opening angle is increasing or decreasing. The door status sensor 50 is also configured to transmit the value of the door opening angle to the first and second base station 10, 20. In this embodiment, this message is transmitted in response to several triggers (e.g. the rate of change of the door opening angle exceeding a threshold, the door opening angle being at a maximum indicating the door being fully open, and the door opening angle being at a minimum indicating the door being fully closed).

Figure 4A:
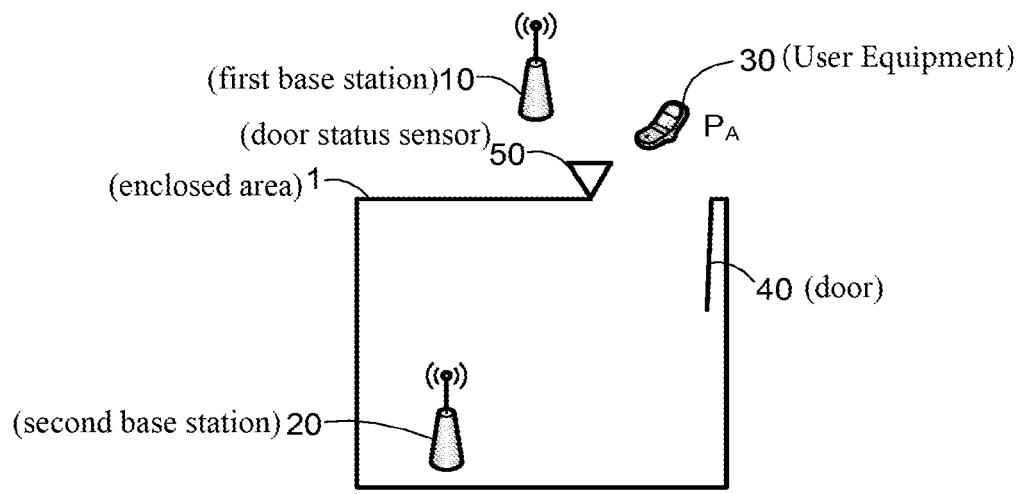
FIG. 4a is a schematic diagram of the network of FIG. 1 in a first state.

A first embodiment of a method will now be described with reference to FIGS. 4a, 4b and 5. The scenario depicted in FIG. 4a is identical to that of FIG. 1. It is also noted that the UE 30 is in position $P_A$ and is connected to the first base station 10. The door 40 is open and the door status sensor 50 sends a signal to the first and second base stations 10, 20 indicating that the door opening angle is indicative of the door being fully open. The first and second base stations 10, 20 receive these signals via their first transceivers and record this data in memory.

Figure 4B:
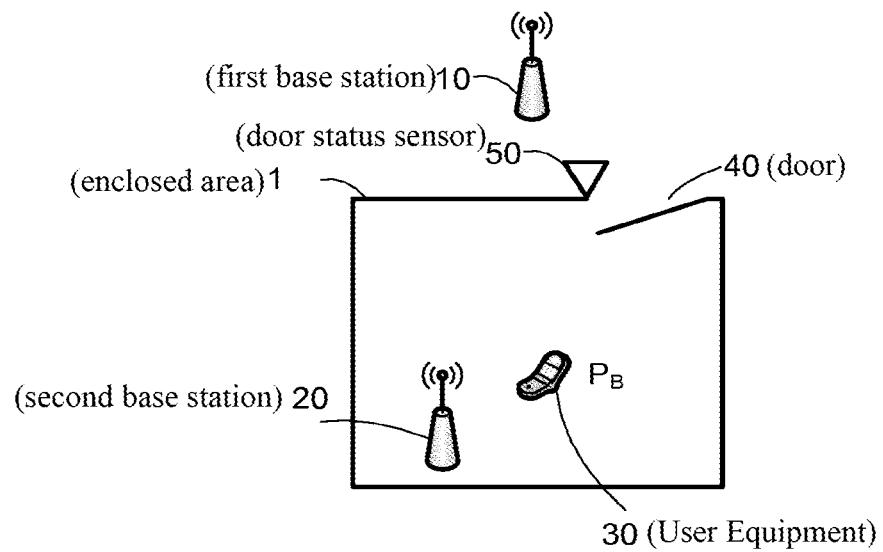
FIG. 4b is a schematic diagram of the network of FIG. 1 in a second state.
Figure 5:
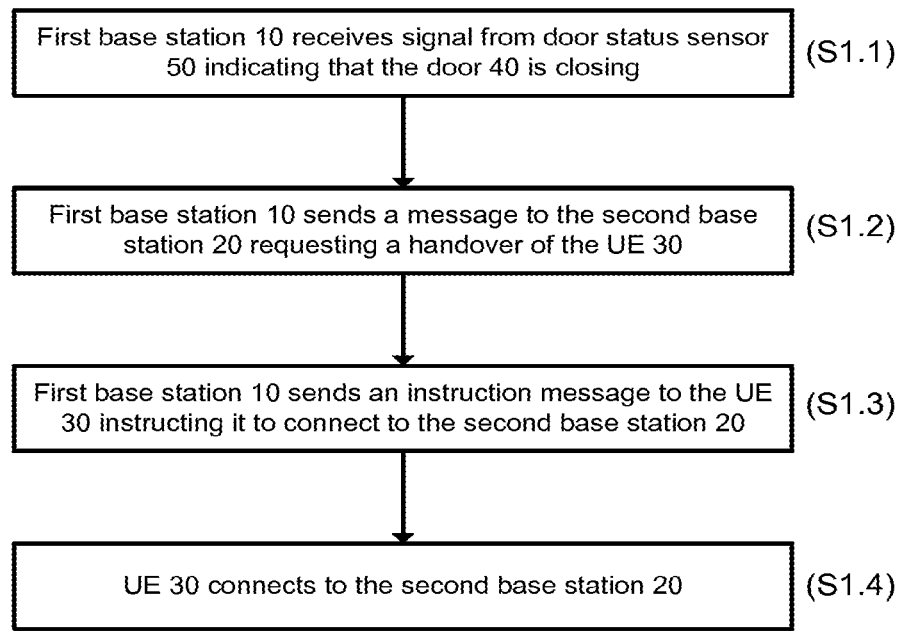
FIG. 5 is a flow diagram illustrating a first embodiment of a method.

FIG. 4b illustrates the same cellular communications network but at a later time. The UE 30 has moved from position $P_A$, outside the enclosed area 1, to position $P_B$, inside the enclosed area 1. The user is also shutting the door such that the door opening angle is decreasing. Accordingly, the door status sensor 50 detects that the rate of change of the door opening angle is greater than a threshold and transmits signals to the first and second base stations 10, 20 indicating that the door is closing.

In this embodiment, the first and second base stations 10, 20 use relatively high-frequency transmissions which are unable to penetrate the building materials of the enclosed area 1. Accordingly, as the user enters the enclosed area 1 and shuts the door behind them (i.e. as the UE 30 moves from position $P_A$ to position $P_B$), the following process (as illustrated in FIG. 5) takes place.

In S1.1, the first base station 10 receives the signal from the door status sensor 50 indicating that the door is closing. In response, in S1.2, the first base station 10 sends a message to the second base station 20 requesting the handover of the UE 30 to the second base station 20, and the second base station 20 responds by sending a handover acceptance message to the first base station 10. In this embodiment, these messages are sent using the first transceivers. In S1.3, the first base station sends an instruction message to the UE 30 instructing it to connect to the second base station 20. These messages are sent and received before the door 40 is shut such that the UE 30 may be instructed to handover to the second base station 20 whilst it may still receive the relatively high-frequency transmissions from the first base station 10. In S1.4, the UE 30 connects to the second base station 20 and all traffic for the UE 30 is redirected via the second base station 20.

Thus, by implementing this embodiment of the method, the cellular network is able to ensure that the UE 30 receives seamless connectivity despite the UE 30 moving to a position where there is no service from its serving base station and the rate of change of received power of signals from the serving base station at the edge of its coverage area is so high that there is not enough time to perform a conventional handover. This problem is solved, in this embodiment, by using an external sensor to indicate that the propagation environment is changing which triggers the handover to the second base station 20.

Figure 6A:
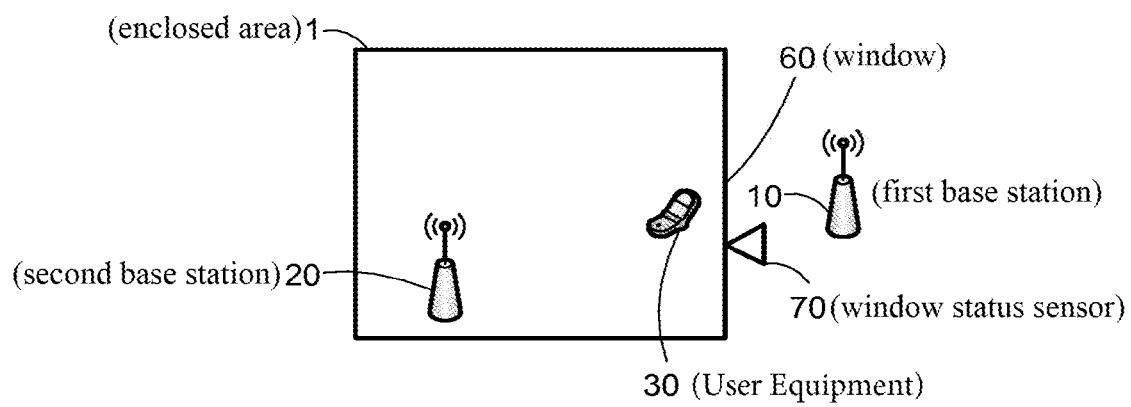
FIG. 6a is a schematic diagram of a second embodiment of a cellular telecommunications network in a first state.

A second embodiment will now be described with reference to FIG. 6a. This embodiment uses the same enclosed area 1, first and second base station 10, 20 and UE 30 as the first embodiment, and the same reference numerals have been used. This embodiment further includes a window 60 and a window status sensor 70, which operate in a similar manner to the door 40 and door status sensor 50 of the first embodiment (such that the window may move between an open and closed state, and the window sensor 70 is configured to produce a signal indicating that the window is open, closed or that the rate of change of window opening angle indicates that the window is opening or closing).

A second embodiment of the method will now be described with reference to FIGS. 6a, 6b and 7. FIG. 6a depicts a first state in which the UE 30 is positioned inside the enclosed area 1 and is connected to the second base station 20. The window 60 is closed and the window status sensor 70 transmits a signal to the first and second base stations 10, 20 indicating the same.

Figure 6B:
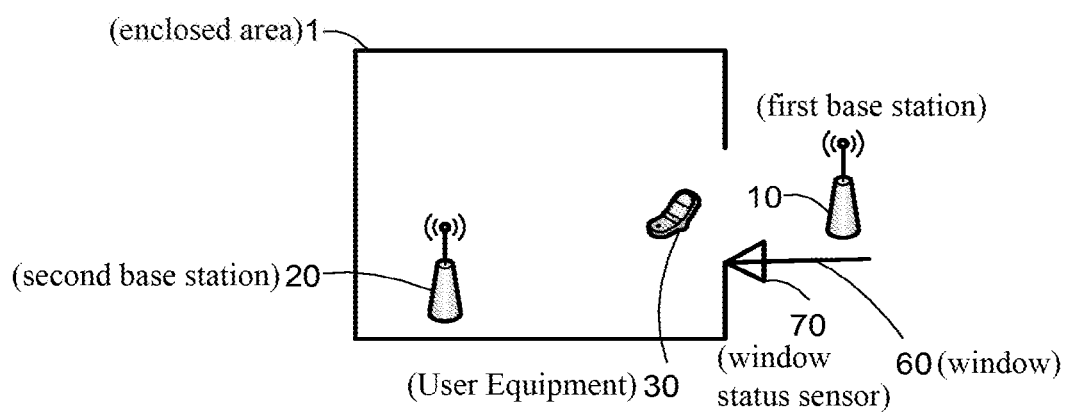
FIG. 6b is a schematic diagram of the network of FIG. 6b in a second state.
Figure 7:
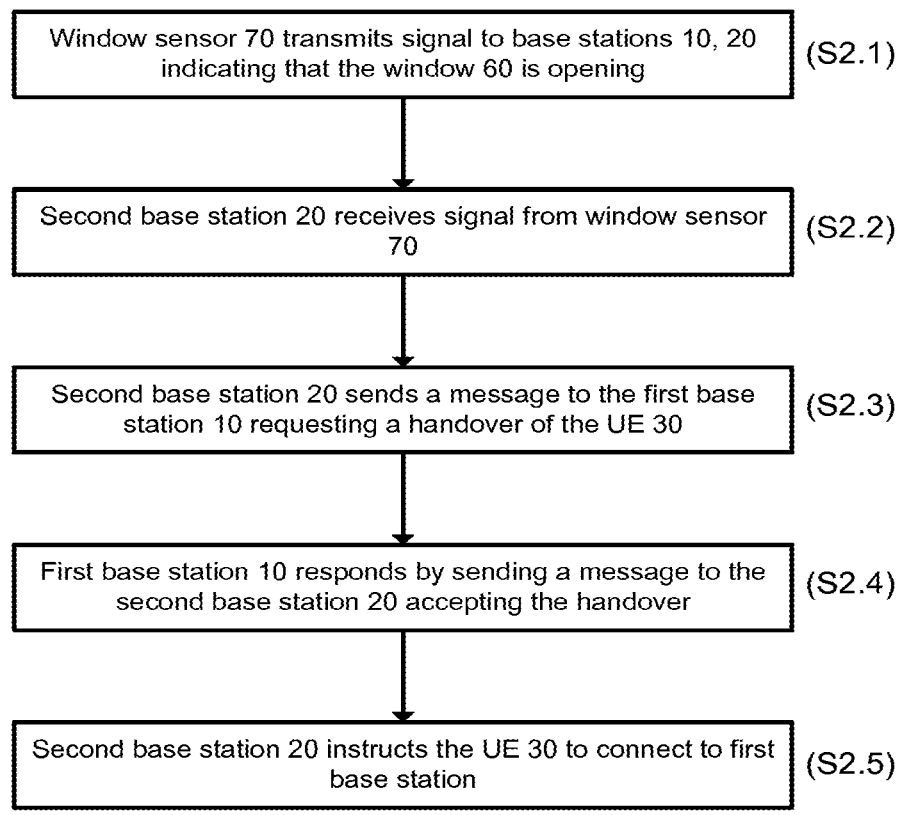
FIG. 7 is a flow diagram illustrating a second embodiment of a method.

FIG. 6b depicts a second state in which the UE 30 is still positioned inside the enclosed area 1 but the window 60 is now open. FIG. 7 illustrates the second embodiment of the method which is implemented in this scenario. In S2.1, the user opens the window 60 and the rate of change of the window opening angle exceeds the threshold such that the window status sensor 70 transmits a signal to the first and second base stations 10, 20 indicating that the window 60 is opening.

In S2.2, the second base station 20 receives this signal and, in response, initiates a handover of the UE 30 to the first base station 10. This is performed as signals from the first base station 10 would otherwise significantly interfere with any transmission between the second base station 20 and the UE 30 if the UE 30 continued to be served by the second base station 20. Accordingly, the second base station 20 sends a message to the first base station 10 requesting a handover of the UE 30 (S2.3), and the first base station responds by sending a message to the first base station 10 accepting the handover (S2.4). The second base station 20 then sends a message to the UE 30 instructing it to connect to the first base station 10 (S2.5), and all traffic for the UE 30 is redirected via the first base station 10.

Thus, the second embodiment of the method also utilizes an external sensor to identify when there is a change in the propagation environment for the UE 30 (despite the UE being static in this example) and, in response, initiates a handover before any reduction in the UE's QoS.

Figure 8A:
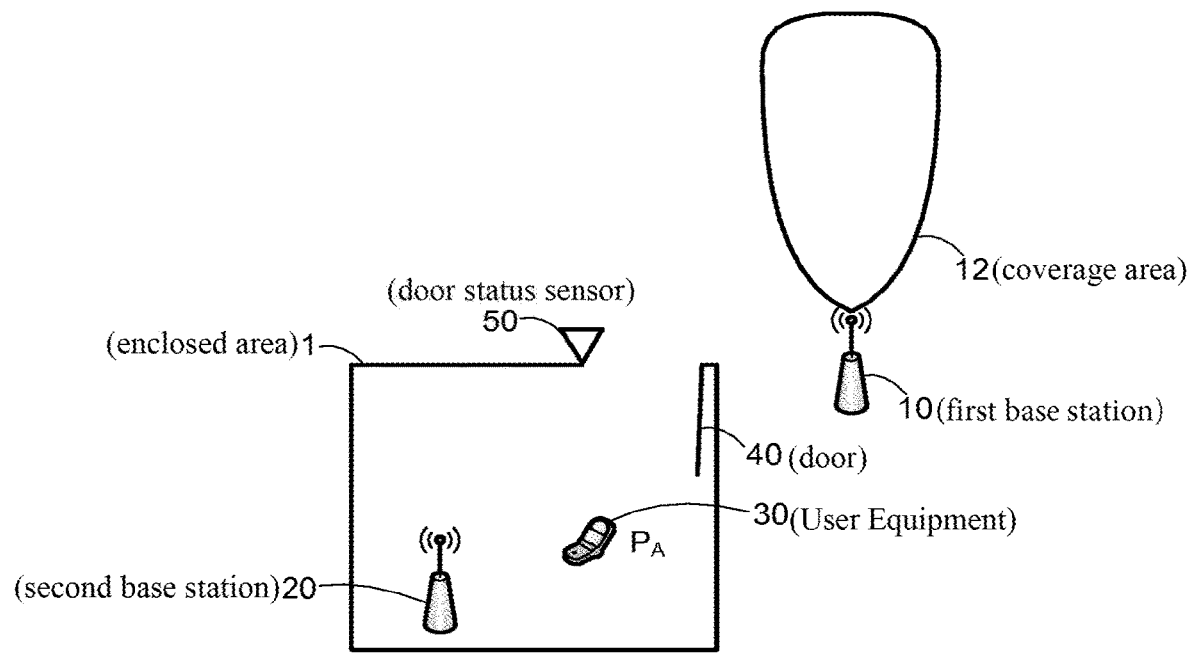
FIG. 8a is a schematic diagram of a third embodiment of a cellular telecommunications network in a first state.

A third embodiment will now be described with reference to FIG. 8a. This embodiment again uses the same enclosed area 1, first and second base station 10, 20 and UE 30 as the first embodiment, and the same reference numerals have been used. In this embodiment, the UE 30 is positioned inside the enclosed area 1 and is connected to the second base station 20. Furthermore, the first base station 10 is positioned outside the enclosed area 1 and has a coverage area 12 depicted in FIG. 8a. The door status sensor 50 is again configured to transmit signals to the first and second base stations 10, 20 indicating whether the door 40 is open, closed, or the rate of change of the door opening angle has exceeded a threshold indicating that the door 40 is opening or closing.

A third embodiment of a method will now be described with reference to FIGS. 8a, 8b and 9. FIG. 8a depicts a first state in which the UE 30 is positioned inside the enclosed area 1 in position $P_A$ and is served by the second base station 20. The door 40 is open and the first and second base stations 10, 20 receive signals indicating the same.

Figure 8B:
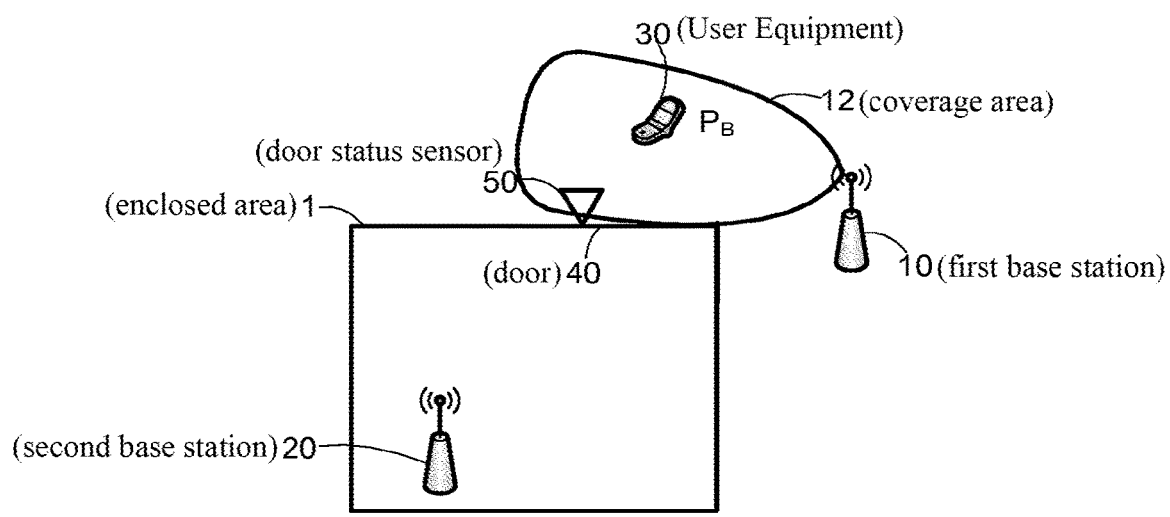
FIG. 8b is a schematic diagram of the network of FIG. 8a in a second state.
Figure 9:
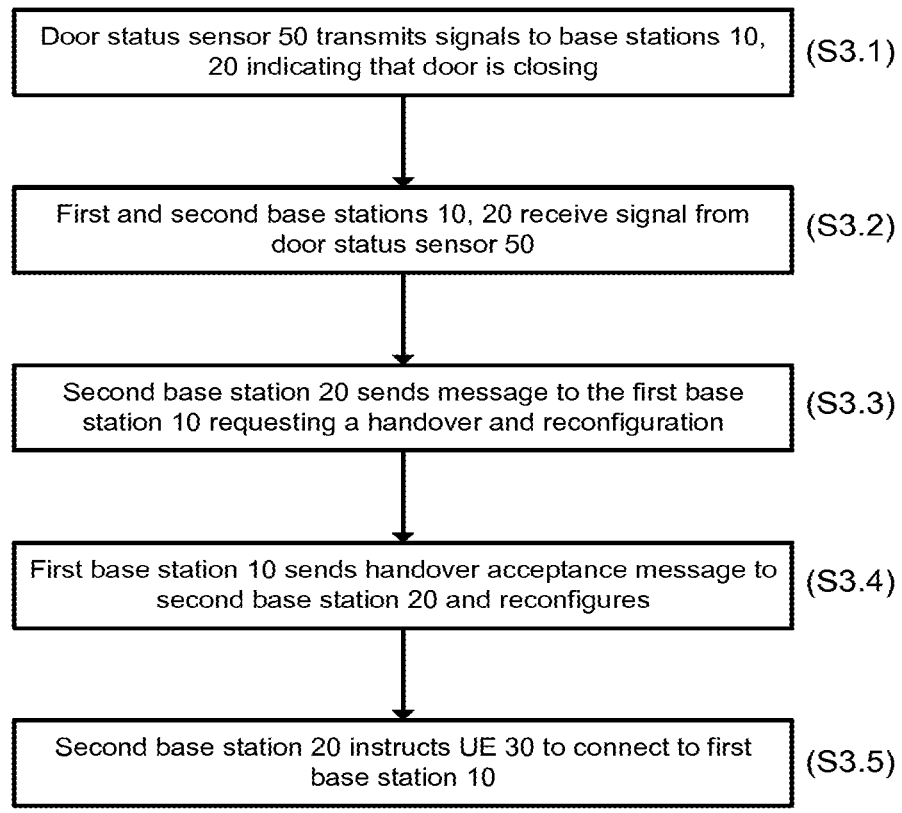
FIG. 9 is a flow diagram illustrating a third embodiment of a method.

FIG. 8b depicts a second state in which the UE 30 is now positioned outside the enclosed area 1 in position $P_B$ and the door 40 is now closed. FIG. 9 illustrates the third embodiment of a method which is implemented in this scenario. In S3.1, the user moves from position $P_A$ to $P_B$. The user is also shutting the door such that the door opening angle is decreasing. Accordingly, the door status sensor 50 detects that the rate of change of the door opening angle is greater than a threshold and transmits signals to the first and second base stations 10, 20 indicating that the door is closing.

In S3.2, the first and second base stations 10, 20 receive and react to this signal. In S3.3, the second base station 20 sends a message to the first base station 10 which requests a) the handover of the UE 30 to the first base station 10 and b) that the first base station 10 reconfigures its antenna configuration such that its coverage area 12 covers the UE's new position $P_B$. The first base station 10 responds by sending a handover acceptance message to the second base station 20 and, in S3.4, by reconfiguring its antenna configuration such that its coverage area 12 includes position $P_B$. In S3.5, the second base station 20 sends an instruction message to the UE 30 instructing it to connect to the first base station 10. These messages are sent and received before the door 40 is shut such that the UE 30 may be instructed to handover to the first base station 10 and the first base station 1 reconfigures its coverage area before the door 40 is closed. In S3.6, the UE 30 connects to the first base station 10 and all traffic for the UE 30 is redirected via the first base station 10.

In a further enhancement to any one of the above embodiments, the first and second base stations 10, 20 are configured to compile a database (stored in memory) having the following data values:
1. An event profile;
2. A possible reconfiguration profile; and
3. A success ratio.

The base stations are configured to store a plurality of different event profiles, wherein each event profile describes a particular sequence of UE and/or sensor based events (e.g. the UE is connected to a particular base station, the sensor detects a particular change, etc.). The base stations are then configured to populate the database with all possible reconfiguration profiles for each event profile, wherein each possible reconfiguration profile describes a particular responsive action the base station may employ in response to that particular event profile (e.g. handover to another base station, reconfigure an antenna configuration). Lastly, the base stations are configured to receive feedback on each reconfiguration profile used in the network and calculate a value of the success ratio of that reconfiguration profile when used in response to that event. An example database is illustrated in Table 1, below:

TABLE 1

Table illustrating event profiles, reconfiguration profiles and success ratio

| Event Profile | Possible Reconfiguration Profile | Success Ratio |
|---|---|---|
| E1 (UE 30 connected to first base station (BS) 10; door sensor 50 indicates that door 40 is closing) | P1 (No reconfiguration) | 0 |
| E1 (UE 30 connected to first BS 10; door sensor 50 indicates that door 40 is closing) | P2 (Handover UE 30 to second BS 20; second BS 20 antenna configuration 1) | 1 |
| E2 (UE 30 connected to second BS 20; door sensor 50 indicates that door 40 is closing) | P3 (No reconfiguration) | 0 |
| E2 (UE 30 connected to second BS 20; door sensor 50 indicates that door 40 is closing) | P3 (Handover UE 30 to first BS 10; first BS 10 antenna configuration 1) | 0.2 |
| E2 (UE 30 connected to second BS 20; door sensor 50 indicates that door 40 is closing) | P3 (Handover UE 30 to first BS 10; first BS 10 antenna configuration 2) | 1 |
| E3 (UE 30 connected to second BS 20; window sensor 70 indicates that window 60 is opening) | P4 (No reconfiguration) | 0.1 |
| E3 (UE 30 connected to second BS 20; window sensor 70 indicates that window 60 is opening) | P5 (Handover UE 30 to first BS 10, first BS 10 antenna configuration 1) | 1 |
| E3 (UE 30 connected to second BS 20; window sensor 70 indicates that window 60 is opening) | P6 (Handover UE 30 to first BS 10, first BS 10 antenna configuration 2) | 1 |

The first and second base stations 10, 20 are therefore able to build an association between each event profile and each reconfiguration profile. This database may increase in size rapidly as each possible event profile (which may comprise a sequence of sub-events each associated with a particular sensor) may be associated with each possible reconfiguration profile (which may comprise each neighboring base station and each possible configuration of that base station, including antenna configuration, power configuration, etc.). The first and second base stations 10, 20 may then trial each possible reconfiguration profile whenever a particular event occurs, and receive feedback on whether that was a success or not (e.g. by the target base station informing it of whether the UE successfully connected and received threshold QoS values) to calculate a success ratio value. Once these reconfiguration profiles have been trialed several times, the database becomes a useful resource for the first and second base stations 10, 20 to make informed decisions on a suitable response to a particular event profile. This improves the likelihood of subsequent responsive reconfigurations being successful.

In the above embodiments, the reconfiguration (e.g. handover) is triggered by a sensor event and is completed before the propagation environment changes. For example, in the first embodiment, the sensor detects that the door is closing, and the handover is complete before the door is closed. However, the skilled person will understand that it is not essential for embodiments of the disclosure to be limited to scenarios in which the reconfiguration completes before the change in the propagation environment. For example, the base stations may be configured to transmit these signals at a relatively low frequency that may span a much larger coverage area and with improved propagation properties through solid materials.

The skilled person will also understand that, in the enhanced embodiment in which the base station improves the likelihood of a reconfiguration being a success based on prior reconfigurations, the base station receives data regarding the success of prior reconfigurations to calculate the success ratio value. This data may be received from another base station, the UE, or another network entity measuring the performance of the UE.

The skilled person will also understand that it is not essential for all steps of the handover process to take place. That is, the preparation phase (in which the base station provides the UE with thresholds for its measurements, and the UE sends a message to the base station when the measurements satisfy such thresholds) are not necessary as the trigger for the reconfiguration is receipt of data from the external sensor. Such a handover may be known as a "blind" handover.

The skilled person will also understand that the above described embodiments are not limited to the reconfiguration of a connectivity parameter for a single UE. That is, the methods may comprise the step of a configuration parameter between a base station and a plurality of UEs being reconfigured in response to data from an external sensor. For example, in the example of the second embodiment in which a window opens and signals from the first base station would significantly interfere with the connection between the second base station and its UEs, the second base station may receive the signal from the window sensor indicating that the window is opening and, in response, initiate the handover of several of its connected UEs to the first base station. There may also be an intermediate step in which the second base station instructs the preparation of measurement reports from its UEs to determine which should be transferred to the first base station.

Furthermore, the methods detailed above may also include determining which UE or group of UEs should be party to the reconfiguration following receipt of the external sensor data based on some logic, such as the determined location of one or more UEs.

Figure 10A:
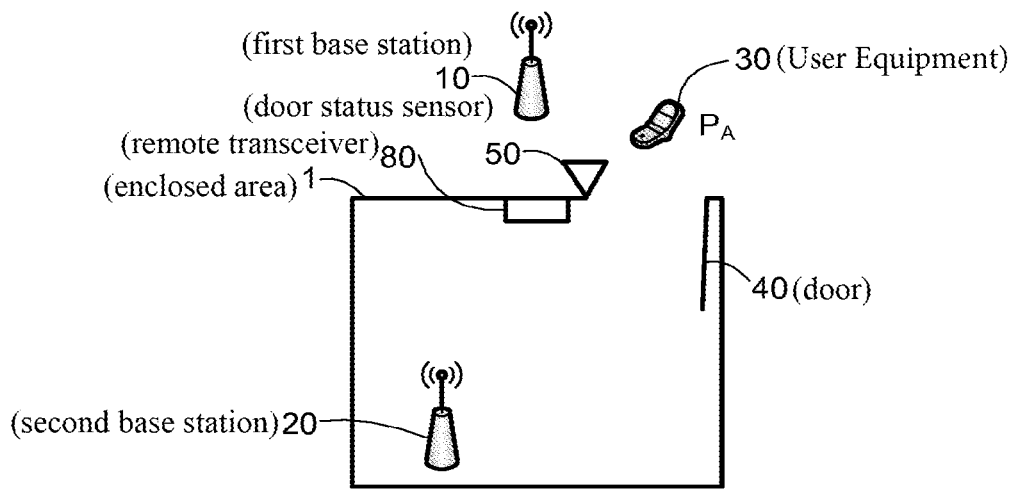
FIG. 10a is a schematic diagram of a fourth embodiment of a cellular telecommunications network of the present disclosure in a first state.

A fourth embodiment of the present disclosure will now be described with reference to FIG. 10a, in which the same reference numerals have been used for similar components. FIG. 10a illustrates an enclosed area 1 and a first and second base station 10, 20. The first base station 10 is outside the enclosed area 1 and the second base station 20 is inside the enclosed area 1. The enclosed area 1 includes a door 40, and a door status sensor 50. As in the previous embodiments, the door sensor 50 is configured to determine the opening angle of door 40 and is configured to transmit a value of the door opening angle in response to several triggers (e.g. the rate of change of the door opening angle exceeding a threshold, the door opening angle being at a maximum indicating the door being fully open, and the door opening angle being at a minimum indicating the door being fully closed).

Figure 11:
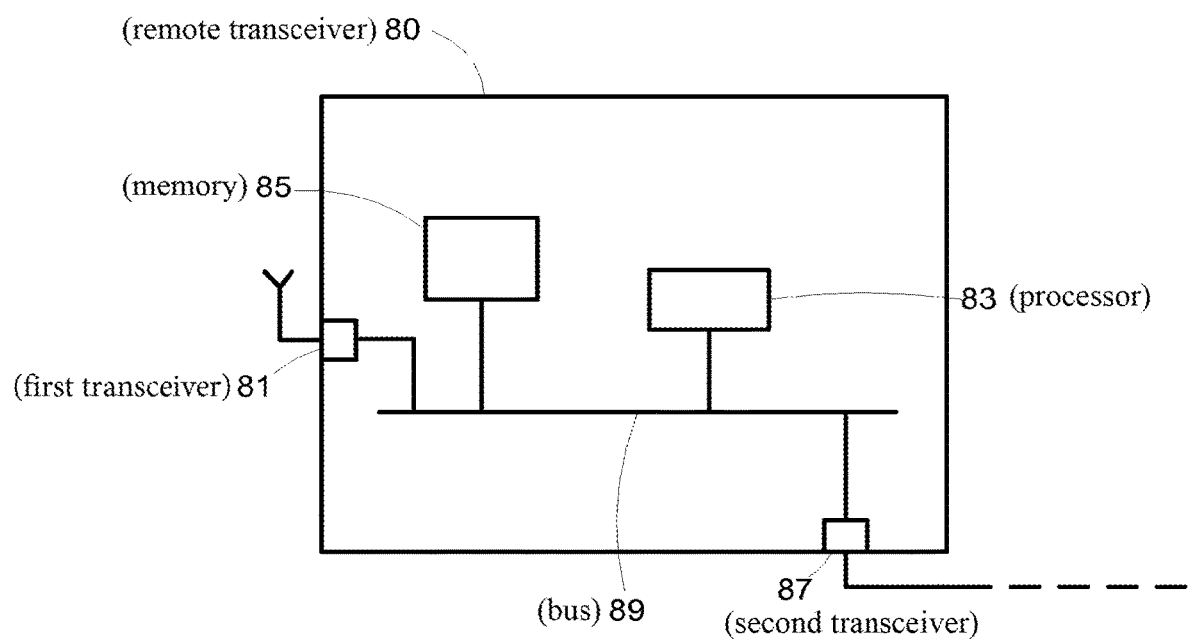
Figure 12:
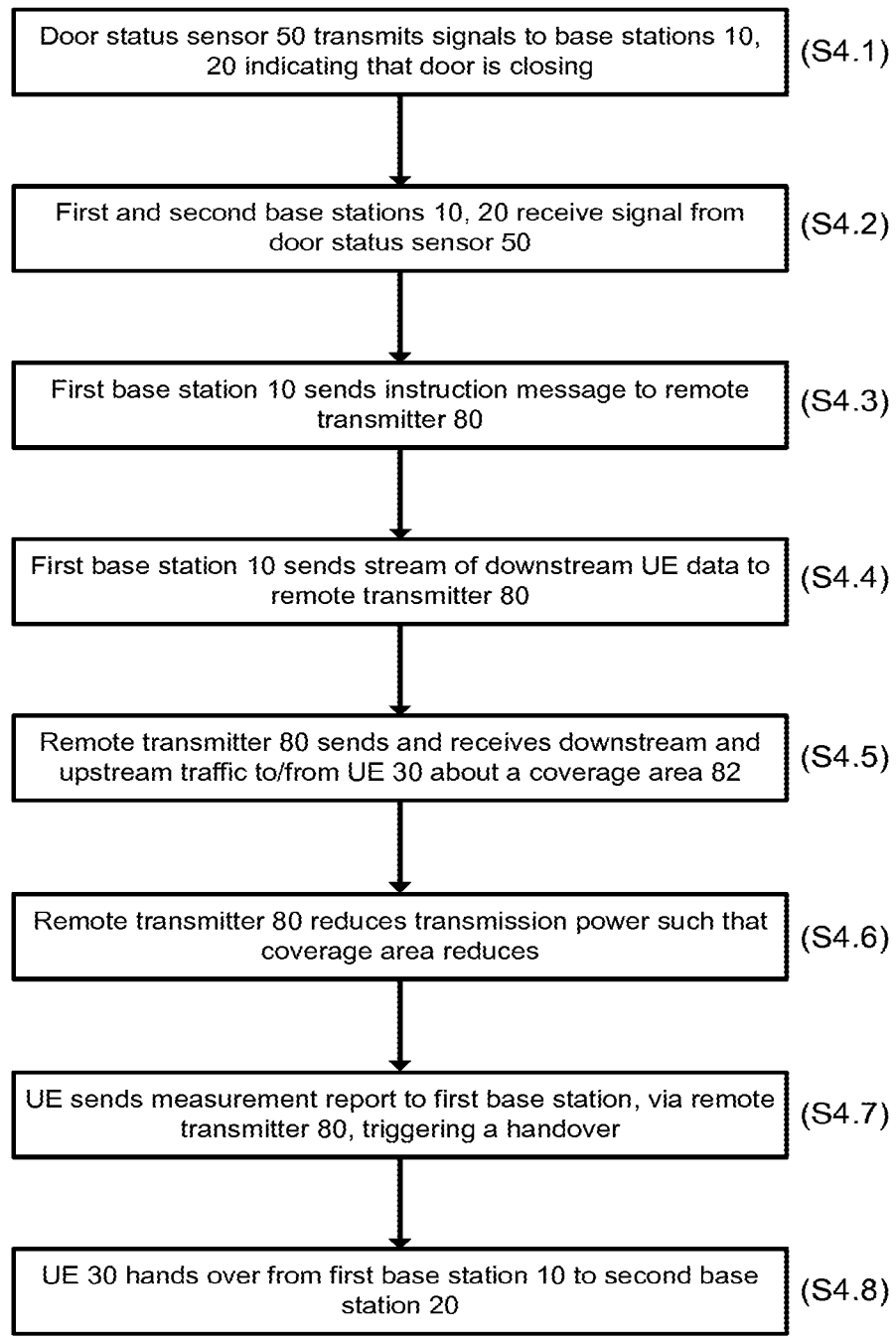
FIG. 12 is a flow diagram illustrating a fourth embodiment of a method of the present disclosure.

FIG. 10a also illustrates a remote transceiver 80. The remote transceiver 80 is shown in more detail in FIG. 11, and includes a first transceiver 81 (configured to communicate with a UE via an antenna), a processor 83, memory 85, and a second transceiver 87, all connected via bus 89. The remote transceiver 80 is configured to receive signals from a base station (such as the first or second base station 10, 20) via the second transceiver 87, and transmit these signals via the first transceiver 81. In this embodiment, the remote transceiver 80 is connected to the first base station 10 via their respective second transceivers 17, 87 (such that the remote transceiver 80 may therefore be considered a remote radio head for the first base station 10), although the remote transceiver 80 is only configured to repeat all signals of the first base station 10 (rather than having distinct transmissions like regular remote radio heads).

Figure 10B:
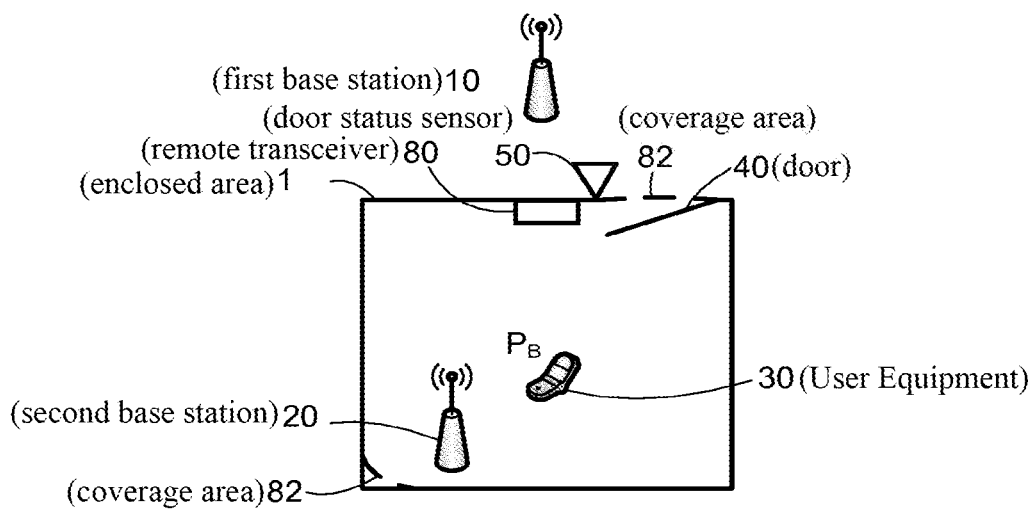
FIG. 10b is a schematic diagram of the network of FIG. 10a in a second state.

A fourth embodiment of a method of the present disclosure will now be described with reference to FIGS. 10a to 10c and FIG. 12. In a first state as shown in FIG. 10a, the UE 30 is positioned outside the enclosed area (in position $P_A$) and is connected to the first base station 10. The UE then moves into the enclosed area 1 to position $P_B$ and the user closes the door 40 (as shown in FIG. 10b), such that the rate of change of the door opening angle exceeds a threshold and the door status sensor 50 produces a signal indicating that the door is closing. In this embodiment, this signal is transmitted to the first and second base stations 10, 20 (step S4.1)

The first base station 10 receives this signal (S4.2) and reacts to it by sending an instruction signal to the remote transceiver 80 (S4.3). This instruction signal is sent via the second transceiver 17 of the first base station 10 to the second transceiver 87 of the remote transceiver 80 (this may be via the cellular core network, or may be an alternative dedicated connection). The remote transceiver 80 receives this instruction signal and, in response, is activated (that is, it switches from an unpowered or low-power state, to a fully powered and fully operational state).

In S4.4, the first base station 10 also sends a stream of UE downstream data to the remote transceiver 80 via their respective second transceivers 17, 87. In this embodiment, this stream of UE downstream data is the same data that is transmitted by the first transceiver 11 to all UEs served by the first base station 10. As shown in FIG. 10b, the remote transceiver 80 is configured to transmit these signals (via its first transceiver 81) about a coverage area 82 that fills the enclosed area 1 (S4.5). In doing so, the first base station 10 and the remote transceiver 80 are able to react to the sensor data indicating that there is going to be a change in the propagation environment between the UE and the first base station 10 to ensure that the UE receives seamless connectivity. Thus, even once the door 40 closes and the UE 30 is in a position that is no longer directly served by the first base station 10, it still maintains its downstream and upstream connection via the remote transceiver 80.

Figure 10C:
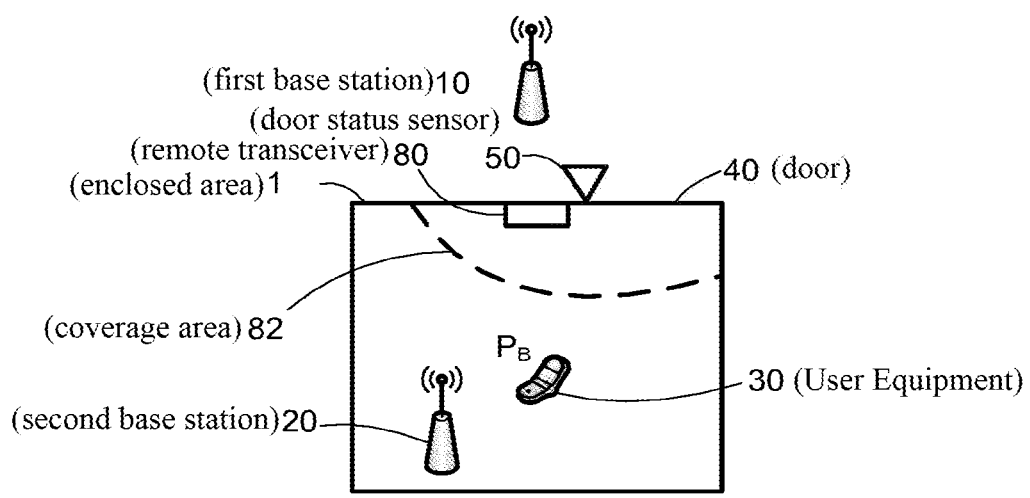
FIG. 10c is a schematic diagram of the network 10a in a third state.

In this embodiment, the UE 30 is encouraged to subsequently hand over to the second base station 20 in the following process. As shown in FIG. 10c, the remote transceiver 80 gradually reduces its coverage area 82 (S4.6), for example, from 100% to 0% of its transmission power over a time period of 10 seconds. In doing so, the UE's 30 connection to the remote transceiver 80 will gradually deteriorate. During this time period, the UE continues to prepare measurement reports of its serving base stations and of other base stations in the network (e.g. the second base station). Eventually, one or more parameters in the measurement report for the first base station will drop below its threshold, thus triggering a handover. The UE 30 will therefore send the measurement reports to the first base station 10 (S4.7), and the first base station 10 will coordinate a handover of the UE 30 to the second base station 20 (S4.8).

The skilled person will understand that it is not essential for the remote transceiver 80 to be a remote radio head of the first base station 10 and/or have a wired connection to the first base station 10. Instead, the remote transceiver 80 may be a cellular repeater in which the second transceiver 87 is an antenna. In this arrangement (and following the example used above), the second transceiver 87 may be positioned outside the enclosed area 1, receive the cellular signals transmitted by the first base station 10, and repeat these signals by transmitting them from the first transceiver 81 into the enclosed area 1. More generally, the cellular repeater may have a plurality of receiving antennas and a plurality of transmitting antennas, which may all be positioned in distinct locations (such as either side of a wall).

The skilled person will also understand that it is not essential for the remote transceiver and first base station 10 to communicate using the backhaul. That is, the first base station 10 and remote transceiver 80 may communicate using distinct antennae operating with a lower frequency range (e.g. one that may penetrate the wall). Furthermore, the remote transceiver 80 may be activated directly by the external sensor (e.g. by receiving the signal from the external sensor at one of its transceivers, or a further transceiver) with no intervention from a base station.

The above embodiments detail several forms of sensor. However, the skilled person will understand that embodiments of the disclosure are not limited to these examples. That is, the benefits of embodiments of the present disclosure may be realized by any sensor that is external to the cellular network and that may detect or predict a change in the propagation environment between the base station and the UE. These sensors may be, for example, mechanical, (e.g. piezoelectric), sound, radiofrequency or motion sensors. Furthermore, the primary purpose of the sensor does not have to be for the benefits of the disclosure. Any device which has a suitable detector for detecting or predicting a change in the propagation environment may be used. For example, a device containing an Intelligent Personal Assistant, IPA, (such as Microsoft® Cortana, or Amazon® Alexa) may be used to detect or predict a change in the propagation environment (for example, if the user instructs the IPA to shut a door or window). Furthermore, it is not essential that the base stations have separate wireless interfaces for communicating with the external sensor. The interface may also be a separate wired interface, or may also be implemented by the first or second transceiver (e.g. the first transceiver using a different frequency to those used with the UE).

In the above embodiments, the base station and UEs are configured for cellular communications above 3 GHz, which would be significantly attenuated by solid materials such that they would be unlikely to penetrate into an area enclosed by solid materials. However, the skilled person will understand that embodiments of the disclosure are not limited to such frequencies. Embodiments of the present disclosure are beneficial in any situation in which there are abrupt changes in the serving base station's coverage area. This may be realized by base stations with relatively low-frequency transmissions (such as traditional base stations operating below 3 GHz) being unable to penetrate areas enclosed by very high density materials (as such materials would still attenuate these transmissions over a very short distance).

Furthermore, the skilled person will understand that any (detected or predicted) change in the propagation environment may be used as the trigger to reconfigure a connectivity parameter for the UE, and embodiments of the disclosure are therefore not limited to the examples identified above. The skilled person will also understand that the particular reconfigurations detailed in the above embodiments are merely examples, and any form of reconfiguration may be used. For example, the serving/target base station may use a different transmission power, frequency band or identifier. Furthermore, the serving base station may handover to another base station, or merely to another sector of the same base station.

The skilled person will also understand that it is not necessary for the base station to react to the data from the sensor indicating a change in the propagation environment. That is, any network node may be configured to receive data from a sensor indicating a change in a propagation environment between a base station and a UE, and, in response, initiate the above detailed methods (such as, for example, sending an instruction message to the base station to initiate a handover of the UE to another base station). Furthermore, such a network node may also be the UE.

The skilled person will understand that any combination of features is possible within the scope of the invention, as claimed.

The invention claimed is:

1. A method of operating a cellular telecommunications network, the cellular telecommunications network including a first base station, a User Equipment (UE) and a remote transceiver, wherein the first base station is adapted to send a signal to the UE, the method comprising:
   receiving data from an external sensor, the external sensor being external to the first base station, the UE, and the remote transceiver, the data indicating a first change in a propagation environment between the first base station and the UE; and, in response,
   the remote transceiver repeating a signal between the first base station and the UE at a first power level; and, subsequently,
   the remote transceiver repeating the signal between the first base station and the UE at a second power level, the second power level being less than the first power level.

2. The method as claimed in claim 1, wherein the remote transceiver is a cellular repeater and receives the data from the external sensor.

3. The method as claimed in claim 1, wherein the remote transceiver has a wired connection to the first base station, the first base station receives the data from the external sensor, and the method further comprises:
   the first base station instructing the remote transceiver to repeat the signal between the first base station and the UE.

4. A non-transitory computer-readable storage medium storing a computer program comprising instructions which, when the computer program is executed by a computer, cause the computer to carry out the method of claim 1.

5. A node for a cellular telecommunications network, the cellular telecommunications network including a first base station and a User Equipment (UE) wherein the first base station is adapted to send a signal to the UE, the node comprising:
   at least one processor and memory operably coupled to the at least one processor; and
   a transceiver operably coupled to the at least one processor and adapted to receive data from an external sensor, the external sensor being external to the first base station, the UE, and a remote transceiver, the data indicating a first change in a propagation environment between the first base station and the UE, and, in response, the transceiver is adapted to repeat a signal between the first base station and the UE, wherein the transceiver repeats the signal between the first base station and the UE at a first power level, and is further adapted to subsequently repeat the signal between the first base station and the UE at a second power level, the second power level being less than the first power level.

6. The node as claimed in claim 5, wherein the node is a cellular repeater, and wherein the transceiver is adapted to receive the data from the external sensor.

* * * * *